(12) United States Patent
Attig et al.

(10) Patent No.: US 7,839,849 B1
(45) Date of Patent: Nov. 23, 2010

(54) FORMATTING FIELDS OF COMMUNICATION PACKETS

(75) Inventors: Michael E. Attig, San Jose, CA (US); Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 205 days.

(21) Appl. No.: 12/237,475

(22) Filed: Sep. 25, 2008

(51) Int. Cl.
*H04L 12/56* (2006.01)
(52) U.S. Cl. .................................. 370/389; 370/401
(58) Field of Classification Search ............... None
See application file for complete search history.

(56) References Cited

U.S. PATENT DOCUMENTS

| | | | | |
|---|---|---|---|---|
| 6,628,653 | B1 * | 9/2003 | Salim | 370/389 |
| 7,266,131 | B2 * | 9/2007 | Mitchell | 370/469 |
| 7,636,908 | B1 * | 12/2009 | Brebner | 716/18 |
| 7,669,166 | B1 * | 2/2010 | Brebner et al. | 716/18 |
| 2006/0221850 | A1 * | 10/2006 | Buckley et al. | 370/252 |
| 2007/0276952 | A1 * | 11/2007 | Mitchell | 709/230 |

OTHER PUBLICATIONS

Attig, Michael et al., "Systematic Characterization of Programmable Packet Processing Pipelines", Field-Programmable Custom Computing Machines, 2006. FCCM apos;06. 14th Annual IEEE Symposium Apr. 2006, pp. 195-204, IEEE, 3 Park Avenue, 17th Floor, New York, NY 10016-5997.*

* cited by examiner

*Primary Examiner*—Jayanti K Patel
*Assistant Examiner*—Matthew Campbell
(74) *Attorney, Agent, or Firm*—LeRoy D. Maunu

(57) ABSTRACT

Approaches for automatically generating a format of a plurality of fields of a plurality of packets of a communication protocol from a specification. The specification that is input specifies the fields of the packets of the communication protocol and indicates a plurality of dependencies between the fields. From the specification, an order of the fields is generated for satisfying the dependencies. The format, which is output, specifies the order for inputting and outputting the fields in each of the packets.

18 Claims, 5 Drawing Sheets

FORMATTING FIELDS OF COMMUNICATION PACKETS

FIELD OF THE INVENTION

The present invention generally relates to generating a packet format for packetized communication protocols.

BACKGROUND

Many communication protocols transfer packets of information. The communication protocol specifies the processing of various types of packets. A circuit can process the packets as specified by the communication protocol. The circuit should achieve certain performance goals, such as low latency, high throughput, and a compact implementation. However, it can be time consuming and difficult to design a circuit that implements the communication protocol and achieves the performance goals.

The present invention may address one or more of the above issues.

SUMMARY

In various embodiments, the invention provides for automatically generating a format of a plurality of fields of a plurality of packets of a communication protocol from a specification. In one embodiment, the method inputs the specification that specifies the fields of the packets of the communication protocol and indicates a plurality of dependencies between the fields. From the specification, an order of the fields is generated for satisfying the dependencies. The format, which is output, specifies the order for inputting and outputting the fields in each of the packets.

In another embodiment, a program storage medium is provided. The program storage medium includes a processor-readable device that is configured with instructions for generating a format of a plurality of fields of a plurality of packets of a communication protocol. Execution of the instructions by one or more processors causes the one or more processors to perform operations including inputting a specification that specifies the fields of the packets of the communication protocol and indicates a plurality of dependencies between the fields. From the specification, an order of the fields for satisfying the dependences is generated. The format, which is output, specifies the order for inputting and outputting the fields in each of the packets.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
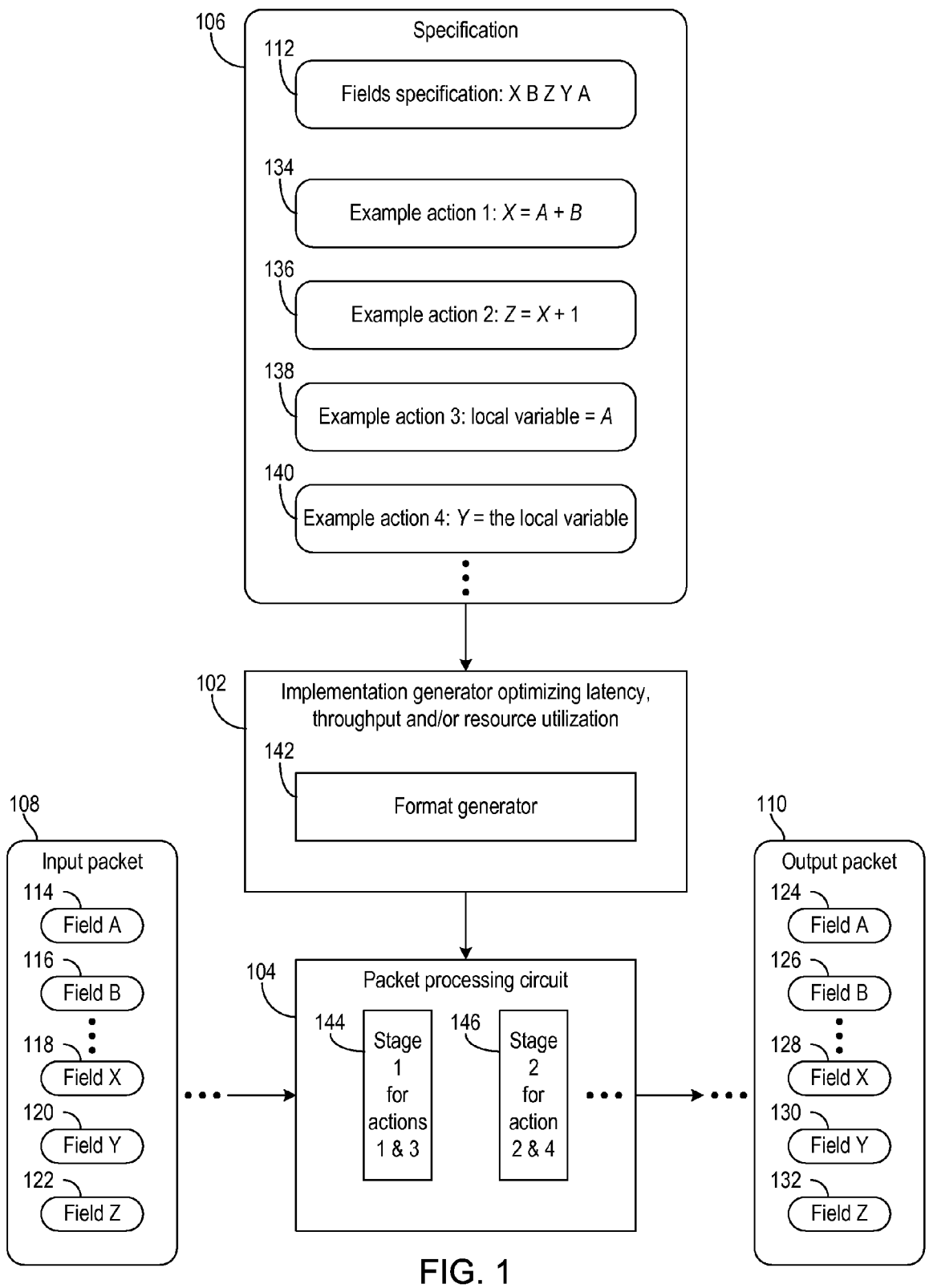
FIG. 1 is a dataflow diagram illustrating generation and operation of a circuit for processing packets in accordance with various embodiments of the invention.

FIG. 1 is a dataflow diagram illustrating generation and operation of a circuit for processing packets in accordance with various embodiments of the invention. A generator 102 generates a circuit 104 from a processing specification 106, and the circuit 104 processes each input packet 108 to generate each output packet 110.

The processing specification 106 includes a specification 112 of the fields of the input and output packets 108 and 110. In one example, the packet processing circuit 104 generates a corresponding output packet 110 from each input packet 108 by modifying the contents of certain fields 114, 116, 118, 120, and 122 of each input packet 108 to generate corresponding fields 124, 126, 128, 130, and 132 of the output packet 110. In another example, the packet processing circuit 104 generates a corresponding output packet 110 from each input packet 108 by deleting certain of the input fields 114 through 122 and/or adding certain of the output fields 124 through 132. In yet another example, there is not a one-to-one correspondence between the input and output packets 108 and 110, because the packet processing circuit 104 consumes certain of the input packets without outputting a corresponding output packet and/or the packet processing circuit generates certain output packets without inputting a corresponding input packet. However, the field specification 112 generally provides a name and a size in bits of each of the fields 114 through 132 appearing in the input and output packets 108 and 110. In one embodiment, the field specification 112 also provides a default ordering of the fields 114 through 122 in each input packet 108 and/or a default ordering of the fields 124 through 132 in each output packet 110.

The processing specification 106 also includes specifications 134, 136, 138, and 140 of actions for manipulating the fields 114 through 122 of the input packets to generate the fields 124 through 132 of the output packets. The example specification 134 specifies summing fields 114 and 116 to generate field 128, the example specification 136 specifies adding a value of one to field 128 to generate field 132, the example specification 138 specifies setting a local variable from field 114, and the example specification 140 specifies setting field 130 from the local variable. Those skilled in the art will recognize that the specified actions are application dependent, and the actions may include any of a variety of actions beyond the examples provided herein.

The generator 102 generates the circuit 104 that produces/generates the output packets from the input packets according the manipulations specified by action specifications 134, 136, 138, and 140. The specification 106 specifies the fields 114 through 122 appearing in each input packet 108, but does not specify the order of the fields 114 through 122 in each input packet 108. Similarly, the specification 106 specifies the fields 124 through 132 without specifying the order of these fields in each output packet 110.

In various embodiments of the invention, the generator 102 includes a format generator 142 that generates an input order of the fields 114 through 122 in each input packet 108 and an output order of the fields 124 through 132 in each output packet 110. The generator 102 then generates a packet processing circuit 104 that inputs the fields 114 through 122 in each input packet 108 in the generated input order, and outputs the fields 124 through 132 in each output packet 110 in the generated output order.

In one embodiment, the format generator 142 selects the input and output orders of the fields to achieve a performance objective for the packet processing circuit 104. For example, the placement of fields 114 and 116 before field 118 in input packet 108 permits circuit 104 to sum fields 114 and 116 as specified in action specification 134 before the arrival of field 118. Circuit 104 can then substitute the calculated sum for field 118 to dynamically output field 128 of the output packet 110 even though other fields 120 and 122 have not yet been input by circuit 104. This "streaming" processing by the packet processing circuit 104 reduces the latency of the processing and the amount of temporary storage needed for packet fields and calculated results. In contrast, the placement of fields 114 and 116 after field 118 in input packet 108 would increase latency and storage resources because circuit 104 cannot sum fields 114 and 116 until after field 118 has already arrived. Thus, various embodiments of the invention select a field ordering for improving the latency, throughput, and/or resource utilization of packet processing circuit 104.

In one embodiment, the packet processing circuit 104 is a pipeline including stages 144 and 146. The generator 102 assigns each of the actions 134, 136, 138, and 140 to one of the stages 144 and 146. The fields of the input and output packets 108 and 110 stream through the pipeline with the fields streaming from the pipeline input to stage 144 and then to stage 146 before reaching the pipeline output. Each stage performs the field manipulations of the actions assigned to the stage. In this example, action 136 is assigned to stage 146 because action 136 depends on the result for field 128 generated by action 134 assigned to stage 144. Thus, stage 146 can perform action 136 after stage 144 has calculated action 134. Action 138 is assigned to stage 144 because action 138 has no dependency on another action, and action 140 is assigned to stage 146 because action 140 depends on action 138. Thus, stage 144 performs actions 134 and 138, and subsequently stage 146 performs actions 136 and 140.

Figure 2:
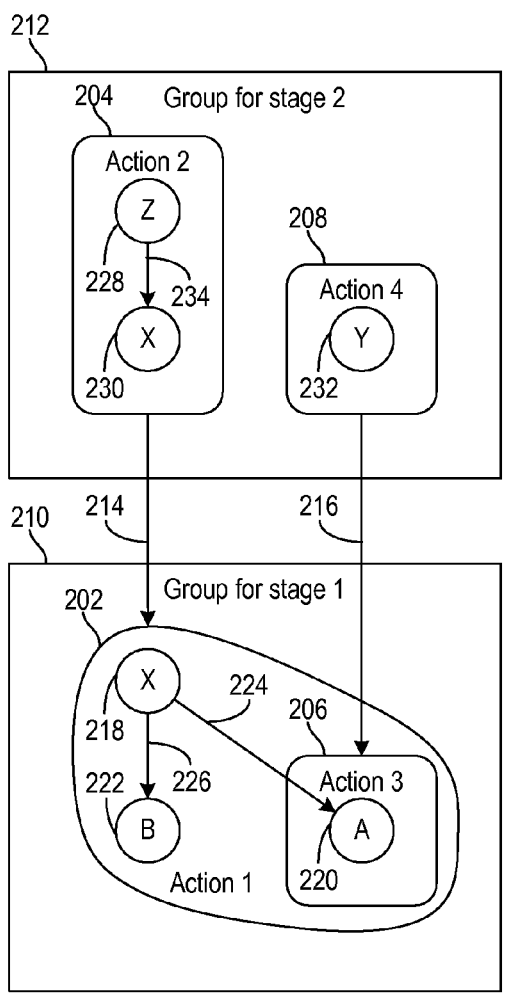
FIG. 2 is a graph diagram illustrating generation of dependency graphs for groups of actions in accordance with various embodiments of the invention.

FIG. 2 is a graph diagram illustrating the generation of dependency graphs for groups of actions in accordance with various embodiments of the invention. FIG. 2 corresponds to the processing specification 106 of FIG. 1, with actions 202, 204, 206, and 208 respectively corresponding to action specifications 134, 136, 138, and 140 of FIG. 1.

The actions 202, 204, 206, and 208 are assigned to groups 210 and 212. Group 210 corresponds to stage 144 of FIG. 1 and group 212 corresponds to stage 146 of FIG. 1. Actions 202 and 206 are assigned to group 210 because actions 202 and 206 have no dependencies on another action. Action 204 is assigned to group 212 because action 204 has a dependency 214 on action 202 assigned to group 210. Similarly, action 208 is assigned to group 212 because action 208 has a dependency 216 on action 206 assigned to group 210.

In one embodiment, the actions 202 and 206 without any dependencies are assigned to an initial group 210. Then the actions 204 and 208 with dependencies only on actions 202 and 206 in the initial group 210 are assigned to a second group 212. Until all actions are assigned to groups, a new group is iteratively created for the actions with dependencies only on already assigned actions. Thus, each group 210 and 212 includes actions that have no dependencies on the other actions in the group. This embodiment generally reduces the number of the groups and the corresponding pipeline stages, and the reduced number of stages tends to reduce the resources required to implement the processing specified by actions 202, 204, 206, and 208.

After the actions 202, 204, 206, and 208 are assigned to groups 210 and 212 to satisfy the dependencies 214 and 216 between the actions, a dependency graph is created for each of the groups 210 and 212.

The dependency graph for group 210 includes nodes 218, 220, and 222 for the fields manipulated by the actions 202 and 206 assigned to group 210. The dependency graph for group 210 also includes edges 224 and 226 for dependencies between the fields manipulated by the actions 202 and 206 assigned to group 210. Action 202 specified by specification 134 of FIG. 1 sums fields 114 and 116 to generate field 128 of FIG. 1. Thus, action 202 provides a node 218 for field 128 of FIG. 1 with respective edges 224 and 226 to the nodes 220 and 222 for the fields 114 and 116 of FIG. 1. Action 206 specified by specification 138 of FIG. 1 provides the node 220 for field 114. In summary, the dependency graph for group 210 includes nodes 218, 220, and 222, and edges 224 and 226, with edge 224 between nodes 218 and 220, and with edge 226 between nodes 218 and 222.

The dependency graph for group 212 includes nodes 228, 230, and 232 for the fields manipulated by the actions 204 and 208 assigned to group 212. The dependency graph for group 212 also includes edge 234 between nodes 228 and 230. Edge 234 corresponds to the dependency between fields 128 and 132 manipulated by action 204 as specified by specification 136. In summary, the dependency graph for group 212 includes nodes 228, 230, and 232, and edge 234 between nodes 228 and 230.

The dependencies generally include both the dependencies 214 and 216 between actions and the dependencies between fields for edges 224, 226, and 234. In one embodiment discussed below in connection with FIG. 3, the dependencies 214 and 216 between actions provide more dependencies between the fields. It will be appreciated that there are various additional kinds of dependencies between actions and/or fields. For example, field specification 112 of FIG. 1 might include a conditional field that is present in a packet for certain values of another field, such as a packet type field. The dependencies then include a dependency between the conditional field and the packet type field.

Figure 3:
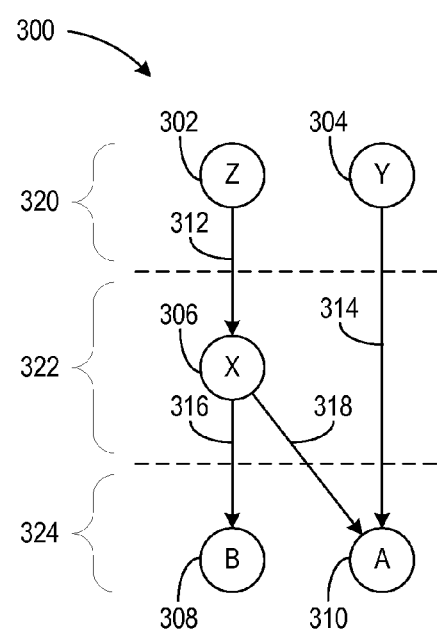
FIG. 3 is a graph diagram of a combined dependency graph in accordance with various embodiments of the invention.

FIG. 3 is a graph diagram of a combined dependency graph 300 in accordance with various embodiments of the invention. The dependency graphs for groups 210 and 212 of FIG. 2 are combined to create a combined dependency graph 300. The combined dependency graph 300 includes nodes 302, 304, 306, 308, and 310, and edges 312, 314, 316, and 318. In one embodiment, a topological sort separates the nodes 302 through 310 into layers 320, 322, and 324.

Referring back to FIG. 2, dependency 214 between actions 202 and 204 indicates that action 202 writes a field and action 204 reads the same field. The combined dependency graph 300 accounts for the dependency 214 by merging the nodes 218 and 230 for the field read and written. The combined dependency graph 300 merges nodes 218 and 230 into node 306. Similarly, dependency 216 between actions 206 and 208 indicates that action 206 writes a local variable and action 208 reads this local variable. Actions 206 and 208 use the local variable to set the field of node 232 to the field of node 220. The combined dependency graph 300 accounts for the dependency 216 with an edge 314 between nodes 304 and 310 that correspond to the nodes 232 and 220.

The combined dependency graph 300 includes node 302 corresponding to node 228 of FIG. 2, node 304 corresponding to node 232, node 306 corresponding to dependency 214 and nodes 218 and 230, node 308 corresponding to node 222, and node 310 corresponding to node 220. The combined dependency graph 300 also includes edge 312 corresponding to edge 234 of FIG. 2, edge 314 corresponding to dependency 216, edge 316 corresponding to edge 226, and edge 318 corresponding to edge 224.

The two-step process of generating dependency graphs for groups of independent actions and combining the dependency graphs into a combined dependency graph 300 is a process producing a combined dependency graph 300 without any cycles. The lack of cycles simplifies the generation of a field order from the combined dependency graph 300. However, in some rare cases not shown, a combined dependency graph includes multiple nodes for certain fields that are both written and read. In one embodiment, extra nodes are ignored and the field order is generated using one node per field.

The combined dependency graph 300 usually provides a partial ordering of the fields of the packets. Because each of nodes 302 through 310 usually corresponds to a respective packet field, the edges 312 through 318 specify a partial ordering of the fields. The ordering is a partial ordering because, for example, edges 316 and 318 specify that the field of node 306 should follow the fields of nodes 308 and 310 in the packet, but the fields of nodes 308 and 310 can appear before the field of node 306 in either possible order. A traversal of the combined dependency graph 300 can determine a possible field orders from the order of visiting the nodes 302 through 310 during the traversal.

In one embodiment, various possible field orders that satisfy the dependencies are generated by multiple traversals of the combined dependency graph 300. The possible orders are evaluated using certain performance criteria, such as latency, throughput, and resource utilization. The selected field order is the possible order with a better or the best performance criteria.

In one embodiment, a topological sort traverses the combined dependency graph 300 to classify the nodes 302 through 310 into layers 320, 322, and 324. The topological sort begins at source nodes 302 and 304 that do not have any incoming edges. The source nodes 302 and 304 are assigned to initial layer 320. Subsequent layer 322 includes node 306 having all incoming edges 312 coming from the nodes 302 and 304 in initial layer 320. The last layer 324 includes nodes 308 and 310 having all incoming edges 314, 316, and 318 coming from the nodes 302, 304, and 306 in the prior layers 320 and 322.

The fields for the nodes 308 and 310 of the last layer 324 appear first in the order of the fields in the packets. The field of node 306 of layer 322 appears next in the order, and the fields of node 302 and 304 of initial layer 320 appear last in the order.

In various embodiments, auxiliary considerations provide the order for fields of nodes within each of the layers 320 and 324. In one embodiment, a default order of the fields provided by specification 112 of FIG. 1 gives the order of the fields within each layer. In another embodiment, the fields are ordered according to the number of edges originating and/or terminating at the nodes within a layer. For example, the field for node 310 is ordered before the field of node 308 because node 310 has two incoming edges 314 and 318 while node 308 has only one incoming edge 316. This order should provide additional time to fanout the field of node 310 to multiple destinations. In yet another embodiment, each of the edges 312 through 318 is weighted with a weight corresponding to a complexity of an operation associated with the edge, and the fields within a layer are ordered according to the weights. For example, the field of node 304 is ordered before the field of node 302 because the weight of the copy operation of edge 314 is less than the total weights of the sum operation of edge 318 and the increment operation of edge 312. In an alternative embodiment, various combinations of these techniques determine the order of the fields within each of the layers 320, 322, and 324.

In one example, the resulting field order is the respective fields of node 310, followed by node 308, node 306, node 304, and finally node 302. In one embodiment, the fields 114 through 122 of each input packet 108 of FIG. 1 correspond respectively to the fields 124 through 132 of a corresponding output packet 110. Because node 310 corresponds to field 114, node 308 corresponds to field 116, node 306 corresponds to field 118, node 304 correspond to field 120, and node 302 corresponds to node 122; the field order in input packet 108 is field 114 followed by fields 116, 118, 120, and finally field 122. Similarly, the field order in output packet 110 is field 124 followed by fields 126, 128, 130, and finally field 132.

Figure 4:
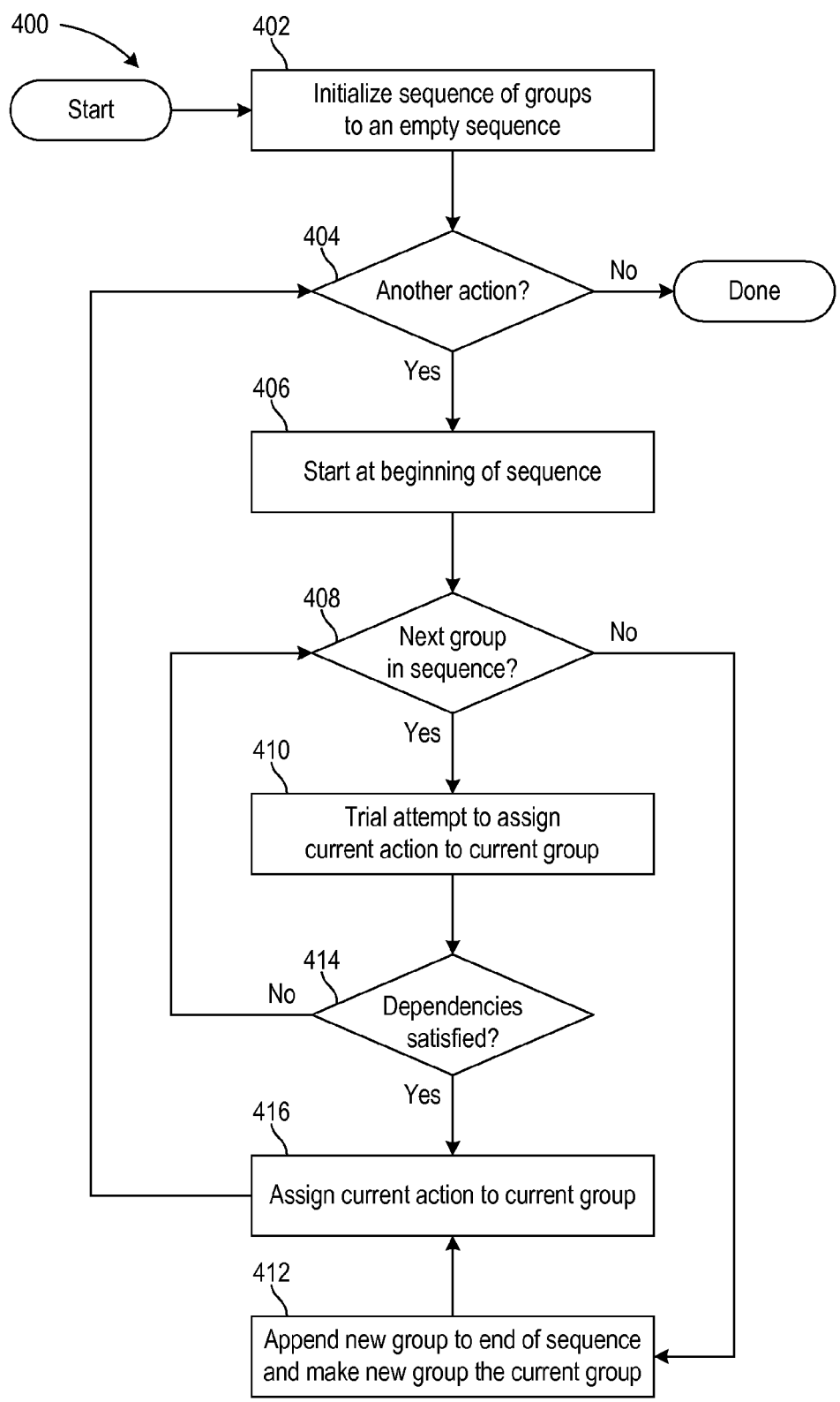
FIG. 4 is a flow diagram of a process for assigning actions to a sequence of groups in accordance with various embodiments of the invention.

FIG. 4 is a flow diagram of a process 400 for assigning actions to a sequence of groups in accordance with various embodiments of the invention. In one embodiment, the groups of actions correspond to stages of pipeline, with each stage implementing the assigned actions.

At step 402, a sequence of groups is initialized to an empty sequence. Decision 404 checks whether there is another action needing assignment to a group. If there is another action needing assignment, process 400 proceeds to step 406. At step 406, the next group considered is reset to the beginning of the sequence. Decision 408 checks whether there is another successive group in the sequence. If there is another successive group to which the current action might be assigned, process 400 proceeds to step 410. Otherwise, the current action could not be assigned to any existing group, and process 400 proceeds to step 412 to create another group appended to the end of the sequence, and the current action is assigned to the new group at step 416.

At step 410, the current action is temporarily assigned to the current group. Decision 414 checks whether the dependencies remain satisfied after assigning the current action to the current group. If the dependencies between actions remain satisfied, the current action is assigned to the current group at step 416. If the dependencies are not satisfied, the trial assignment of the current action to the current group is undone and process 400 proceeds to decision 408 to check whether the current action can be assigned to the next group in the sequence.

Figure 5:
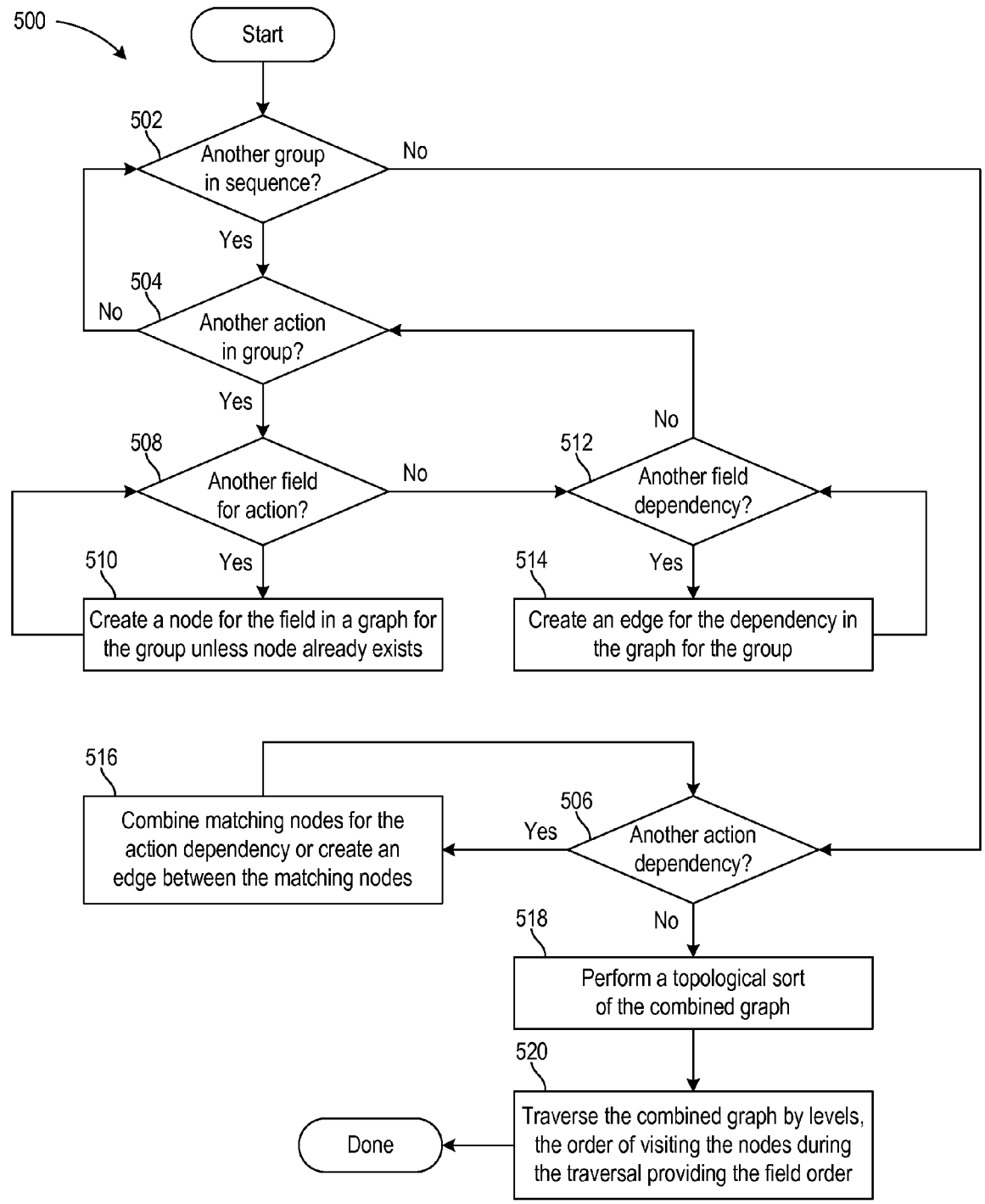
FIG. 5 is a flow diagram of a process for generating an order of fields of packets of a communication protocol in accordance with various embodiments of the invention.

FIG. 5 is a flow diagram of a process 500 for generating an order of fields of packets of a communication protocol in accordance with various embodiments of the invention. Respective dependency graphs are created for groups of independent actions, the dependency graphs are combined, and the field order is determined from a traversal of the combined dependency graph.

Decision 502 checks whether a sequence of groups contains another group to be considered. If there is another group, process 500 proceeds to decision 504; otherwise process 500 proceeds to decision 506. Decision 504 checks whether there is another action in the current group. If there is another action, process 500 proceeds to decision 508. Otherwise, process 500 has completed generating a dependency graph for the current group and process 500 returns to decision 502 to generate another dependency graph for the next group in the sequence.

Decision 508 checks whether another field is manipulated by the current action in the current group. If there is another manipulated field, process 500 proceeds to step 510; otherwise process 500 proceeds to decision 512. At step 510, a node is created for the current field in the dependency graph for the current group unless a node already exists for the current field.

Decision 512 checks whether there is another field dependency for the current action in the current group. If there is another field dependency, process 500 proceeds to step 514; otherwise, process 500 returns to decision 504. At step 514, an edge is created for the field dependency in the dependency graph for the current group.

Decision 506 checks whether there is another action dependency. If there is another action dependency, process 500 proceeds to step 516; otherwise, process 500 proceeds to step 518. At step 516, the action dependency links two actions assigned to two different groups, and the dependency graphs for the two groups are linked together. The dependency graphs for the two groups are linked together between respective nodes for the two actions. Depending upon the type of the action dependency, the two dependency graphs are linked by combining the nodes for the two actions into a single node, or by adding an edge between the two nodes.

At step 518, a topological sort of the combined dependency graph creates layers of the nodes of the combined dependency graph. At step 520, the combined dependency is traversed by levels, and the order of visiting the nodes during the traversal provides the order of the fields in the packets of the communication protocol.

Figure 6:
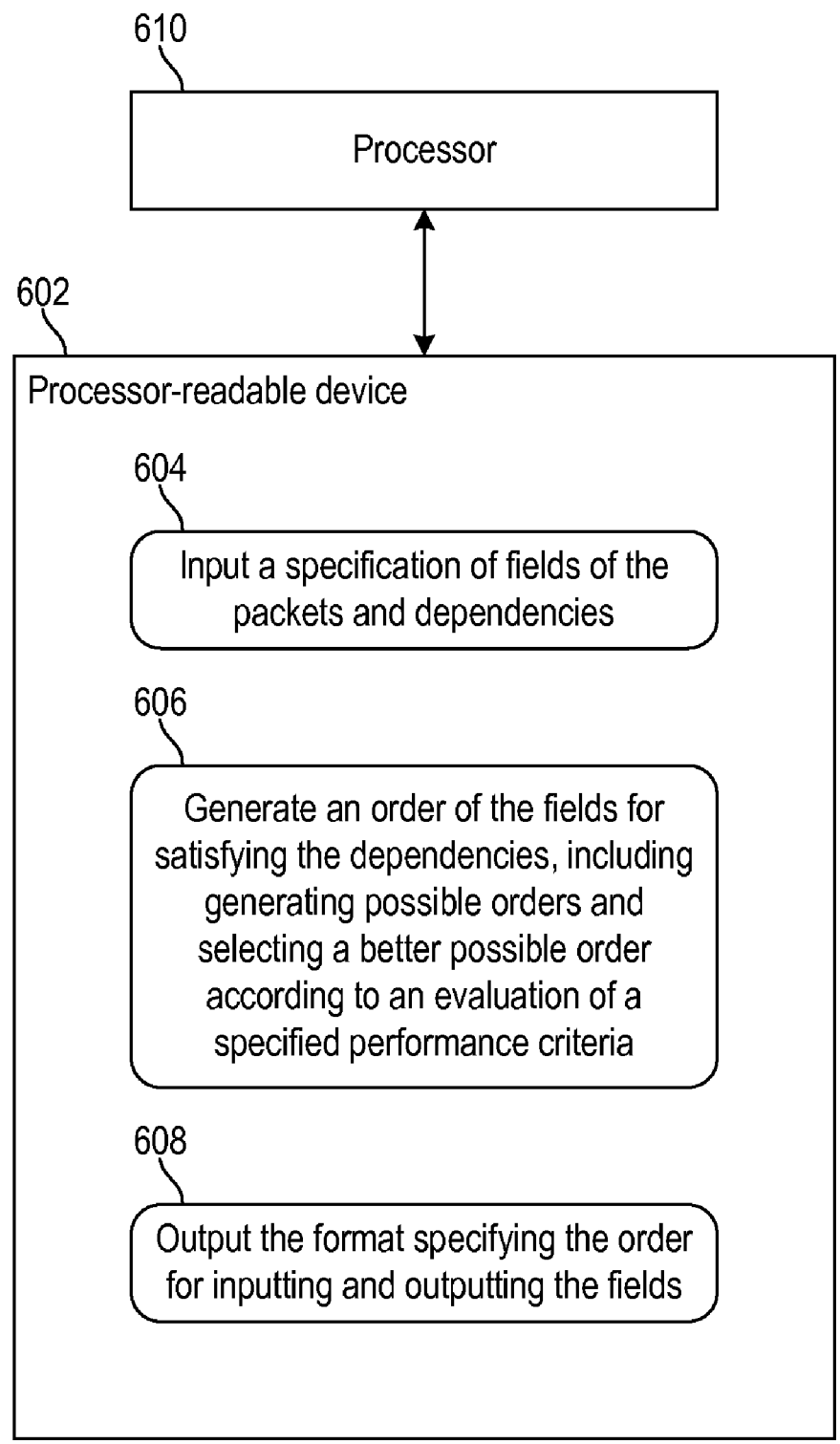
FIG. 6 is a block diagram of a system for generating an order of fields of packets of a communication protocol in accordance with one or more embodiments of the invention.

FIG. 6 is a block diagram of a system for generating an order of fields of packets of a communication protocol in accordance with one or more embodiments of the invention.

A processor-readable device 602 is configured with software modules 604, 606, and 608 for generating a format the fields of the packets of a communication protocol. Execution of the instructions of software module 604 by processor 610 causes processor 610 to input a specification specifying the fields of the packets and one or more dependences. Execution of the instructions of software module 606 by processor 610 causes processor 610 to generate an order of the fields from the specification. The order of the fields satisfies the dependences. In one embodiment, multiple possible orders are generated and a better one of the possible orders is selected according to an evaluation of a specified performance criteria. Execution of the instructions of software module 608 by processor 610 causes processor 610 to output the format specifying the order for inputting and outputting the fields in each of the packets.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for generating a packet format. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method of generating a format of a plurality of fields of a plurality of packets of a communication protocol, the method comprising:

executing instructions on at least one processor to perform operations including:

inputting a specification that specifies the fields of the packets of the communication protocol and that indicates a plurality of dependencies between the fields;

wherein the specification further specifies a plurality of actions for manipulating the fields;

generating, from the specification, an order of the fields for satisfying the dependencies;

wherein the generating of the order includes:

assigning the actions to a plurality of groups; and for each of the dependencies that is a dependency between two of the actions, assigning the two actions to different ones of the groups; and outputting the format specifying the order for inputting and outputting the fields in each of the packets.

2. The processor-implemented method of claim 1, wherein the dependencies include a dependency between two of the fields for improving at least one of performance criteria including latency, throughput, and resource utilization.

3. The processor-implemented method of claim 1, wherein:

the order is an order of inputting and outputting the fields in each of the packets by a circuit that manipulates the fields of the packets as specified by the actions; and the dependencies include a respective dependency for each of a plurality of pairings of the fields, the respective dependency for improving at least one of performance criteria including latency of the circuit, throughput of the circuit, and resource utilization for implementing the actions in the circuit.

4. The processor-implemented method of claim 1, wherein:

the actions include an action for setting a first one of the fields to a value as a function of at least a second one of the fields; and the action indicates a respective dependency between the first field and each of the at least second one of the fields.

5. The processor-implemented method of claim 1, wherein the dependencies include a dependency between a first one and a second one of the actions.

6. The processor-implemented method of claim 5, wherein the dependency between the first and second actions indicates at least one dependency between the fields.

7. The processor-implemented method of claim 5, wherein the second action sets one of the fields and the first action reads the one field.

8. The processor-implemented method of claim 5, wherein the first action sets a first one of the fields to a value as a function of a local variable, the second action generates the local variable as a function of at least a second one of the fields, and the dependency between the first and second actions indicates a respective dependency between the first field and each of the at least second one of the fields.

9. The processor-implemented method of claim 1, wherein the assigning the actions to the groups includes sequentially assigning each action to a group in a sequence of the groups, appending a new group to the sequence and assigning an action to the new group in response to the dependencies not being satisfied for the action for any other group in the sequence.

10. The processor-implemented method of claim 1, wherein the generating of the order further includes generating a plurality of respective graphs for the groups, the respective graph for each group including a node for each field manipulated by each action assigned to the group and an edge for each dependency indicated by each action assigned to the group, the dependency being between a first one and a second one of the fields and the edge being between the nodes of the first and second fields.

11. The processor-implemented method of claim 10, wherein the generating of the order further includes combining the respective graphs for the groups into a combined graph, the combined graph including a corresponding node for each node of each of the respective graphs and further including a corresponding edge for each edge of each of the respective graphs.

12. The processor-implemented method of claim 11, wherein for each successive first and second one of the groups in a sequence of the groups, the sequence having the first field for a first node of the respective graph of the first group being a same field as the second field for a second node of the respective graph of the second group, the corresponding node in the combined graph for the first node is a same node as the corresponding node in the combined graph for the second node.

13. The processor-implemented method of claim 11, wherein the generating of the order further includes generating the order of the fields from an order of visiting the nodes for the fields during a traversal of the combined graph.

14. The processor-implemented method of claim 13, wherein the generating of the order includes performing a topological sort of the combined graph and visiting the nodes during the traversal in an order of a plurality levels of the topological sort.

15. The processor-implemented method of claim 1, wherein the generating the order of the fields for satisfying the dependences includes:
    generating a plurality of possible orders of the fields that satisfy the dependences;
    evaluating the possible orders using a performance criterion; and
    selecting one of the possible orders evaluated as having a satisfactory performance criterion.

16. The processor-implemented method of claim 15, wherein the generating of the plurality of possible orders of the fields includes generating a partial order of the fields for satisfying the dependencies, and the partial order specifies the plurality of possible orders of the fields.

17. The processor-implemented method of claim 15, wherein the performance criterion is at least one of latency, throughput, and resource utilization.

18. A non-transitory program storage medium, comprising:
    a processor-readable storage device configured with instructions for generating a format of a plurality of fields of a plurality of packets of a communication protocol, wherein execution of the instructions by one or more processors causes the one or more processors to perform operations including:
    inputting a specification that specifies the fields of the packets of the communication protocol and that indicates a plurality of dependencies between the fields;
    wherein the specification further specifies a plurality of actions for manipulating the fields;
    generating, from the specification, an order of the fields for satisfying the dependences;
    wherein the generating of the order includes:
        assigning the actions to a plurality of groups; and
        for each of the dependencies that is a dependency between two of the actions, assigning the two actions to different ones of the groups; and
    outputting the format specifying the order for inputting and outputting the fields in each of the packets.

* * * * *